United States Patent

[11] 3,626,489

| [72] | Inventor | Robert J. Pioch<br>Jackson, Mich. |
|------|----------|-----------------------------------|
| [21] | Appl. No. | 873,156 |
| [22] | Filed | Nov. 3, 1969 |
| [45] | Patented | Dec. 7, 1971 |
| [73] | Assignee | Kysor Industrial Corporation |

[54] TILT DUMP VEHICLE WITH LOAD EJECTING MEANS
7 Claims, 6 Drawing Figs.

[52] U.S. Cl. .................................................. 214/510,
214/82, 298/1 B
[51] Int. Cl. ...................................................... B60p 1/04
[50] Field of Search ............................................ 298/1 B, 22,
23 F, 23 DF, 22 F; 214/510, 508, 82 R, 514, 500,
501, 502

[56] References Cited
UNITED STATES PATENTS
| 376,902 | 1/1888 | McEwen ..................... | 298/23 |
| 3,164,410 | 1/1965 | Robinson et al. ............. | 298/1 |

*Primary Examiner*—Milton Buchler
*Assistant Examiner*—F. K. Yee
*Attorney*—Price, Heneveld, Huizinga & Cooper

ABSTRACT: A closed body for a tilt-bed vehicle has an openable rear end and when raised pulls a cargo ejecting bar rearwardly inside the body to assist the discharge of the contents. A chain and cable mechanism actuates the ejecting bar by the lifting of the body.

INVENTOR,
Robert J. Proch
BY
Harness, Dickey & Pierce
ATTORNEYS.

INVENTOR.
Robert J. Pioch
BY
Harness, Dickey & Pierce
ATTORNEYS

TILT DUMP VEHICLE WITH LOAD EJECTING MEANS

BACKGROUND OF THE INVENTION

In the collection and disposal of refuse, it has become common practice to employ containers proportioned as large, closed, van-type bodies for vehicles which deliver them to a dumpsite where the rear of the container is opened and the contents discharged. Commonly also the load is compacted in the van body, and so tends to exert lateral pressure on the walls. Discharging the contents of such bodies has presented certain problems. Two general types of load discharging systems are currently employed. In one system the container body is tapered to enlarge cross section toward the rear, and the tilt bed of the vehicle is capable of reaching a high angle, e.g. 65° (cf. Pioch U.S. Pat. No. 3,421,793) to dump the contents under gravity. Under certain conditions, as for example where such dumping must take place on soft or uneven ground, it is desirable to employ lateral stabilizing means (such as that which is also disclosed in the aforementioned patent) to prevent the vehicle from tipping to the side. The other currently used system, illustrated in Bowles U.S. Pat. No. 3,059,789, employs a large pushout blade occupying the entire cross section of an untapered container body, and which can be powered to the rear by a winch to eject the load from the body without tilting it. The latter system suffers from the disadvantage that the push out blade and its operating mechanism reduce considerably the useful load which the vehicle can carry, and introduce complication and cost. While in the first mentioned system the stabilizing means is left at the dumpsite rather than carried around with the vehicle, it also entails a certain amount of additional cost and apparatus on the vehicle itself, and also causes delay at the dumpsite due to the necessity of attaching and detaching the stabilizing means.

The overall objective of the present invention may be summarized as comprising the provision of improved means of simple and inexpensive character, mounted upon the hauling vehicle and the van body, which is compact and light in weight, does not materially affect the load carrying capacity of the vehicle, and which is quickly and automatically operable without special attention by the operator, to effectively discharge the compacted contents from such container bodies.

Other objects and advantages will be apparent upon consideration of the present disclosure in its entirety.

BRIEF DESCRIPTION OF THE FIGURES OF DRAWING (All of which Are Somewhat Diagrammatic)

DETAILED DESCRIPTION OF PREFERRED FORM OF THE INVENTION

Figure 1:
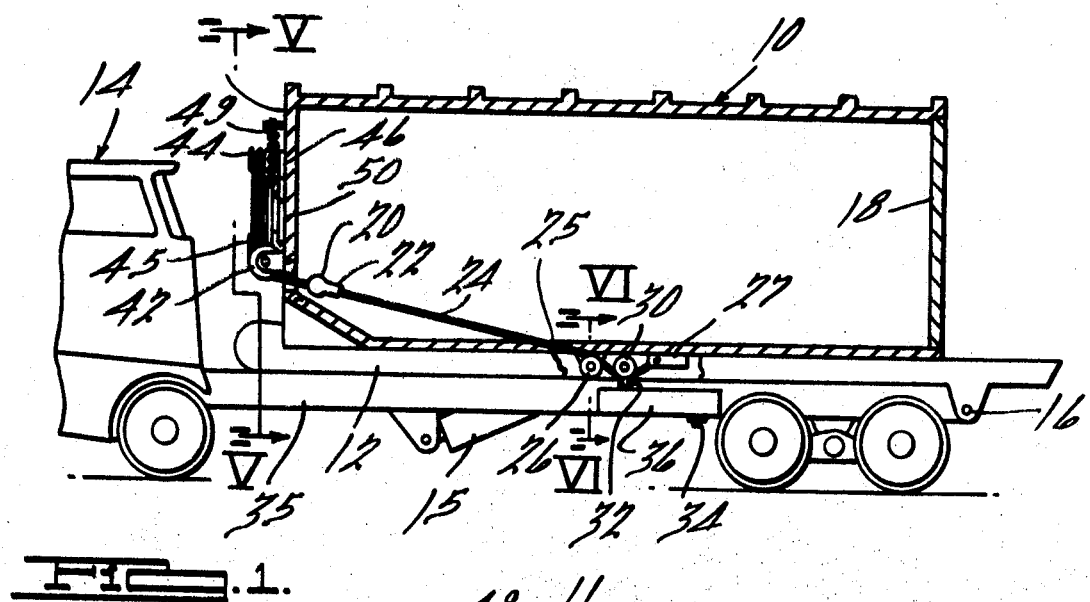
FIG. 1 is a side elevational view of a vehicle and container van body incorporating the present invention, showing the body in lowered transporting position.

Reference character 10 designates generally a reinforced van-type container body the construction of which may correspond generally to that disclosed in Pioch U.S. Pat. No. 3,250,414, and which is adapted to be loaded from the rear by compaction loading apparatus of the type disclosed in said patent. In FIG. 1, the container body 10 is shown in transporting position on the tilt bed frame 12 of a transporting vehicle 14. At the dumpsite, the tilt bed frame and body 10 are adapted to be raised by hydraulic cylinder means 15 which tilts them upwardly about the rear pivot 16 which connects the tilt bed frame 12 to the vehicle chassis frame 35. Rear door 18 is of course open to expose the entire cross section of the rear of the body to permit the contents to slide out.

In order to assist ejection of the contents from the tilted body, I provide load pushing and loosening means comprising a steel tube 20 of relatively large diameter, e.g. 10 to 15 inches, extending transversely substantially the full width of the body near the front and adapted to be powered toward the rear to assist in clearing the load. The ejector or clearance tube 20 is positioned close to the front wall 11 of the body when the latter is in the lowered, transporting position, but moves toward the rear as the body is lifted. On each end of the tube 20 is a fitting 22 for attachment of a cable 24. Each cable extends rearwardly from its fitting and angularly downwardly through a small guide hole 25 in the floor of the body, over a guide pulley 26 journaled on the underframe 28 of the body, under a pulley 30 carried by a pulley block 32 and then to an anchor 27 on the underside of the body 10. Each of the pulley blocks 32 is connectable by means of a chain 33 to an anchor 34 attached to the chassis frame 35 of the vehicle. Each of the anchors 34 is contained in a chain box 36, the boxes being attached to the outsides of the main side rails of chassis frame 35.

My preferred means for pulling tube 20 back to the front of the container as the body is lowered comprises a cable 40 attached to the center of the tube 20 and extending forwardly through a hole 41 in the front wall 11 of the body 10, upwardly over a pulley 42, around a takeup pulley 44, and in a plurality of loops around the latter pulley, which is movable, and another pulley, 45, journaled in fixed position on the front wall 11 of the body. The end of cable 40 is fastened to a vertically swingable arm 46 which carries the takeup pulley 44. Arm 46 extends transversely of the front wall of the body, its farther end being pivoted at pivot 48 on the front wall of the body. Movement of arm 46 permits the pulley 44 to move toward and from pulley 45 to prevent unwanted slackening of the cables 40, 24. The arm 46 is biased upwardly by a spring 49 and as the body is lowered, arm 46 is positively moved to and held in the raised position by a rod 50 guided for vertical sliding movement on the front wall of the body and which at such time bears against the bottom of arm 46 and the top of vehicle frame 35.

Figure 2:
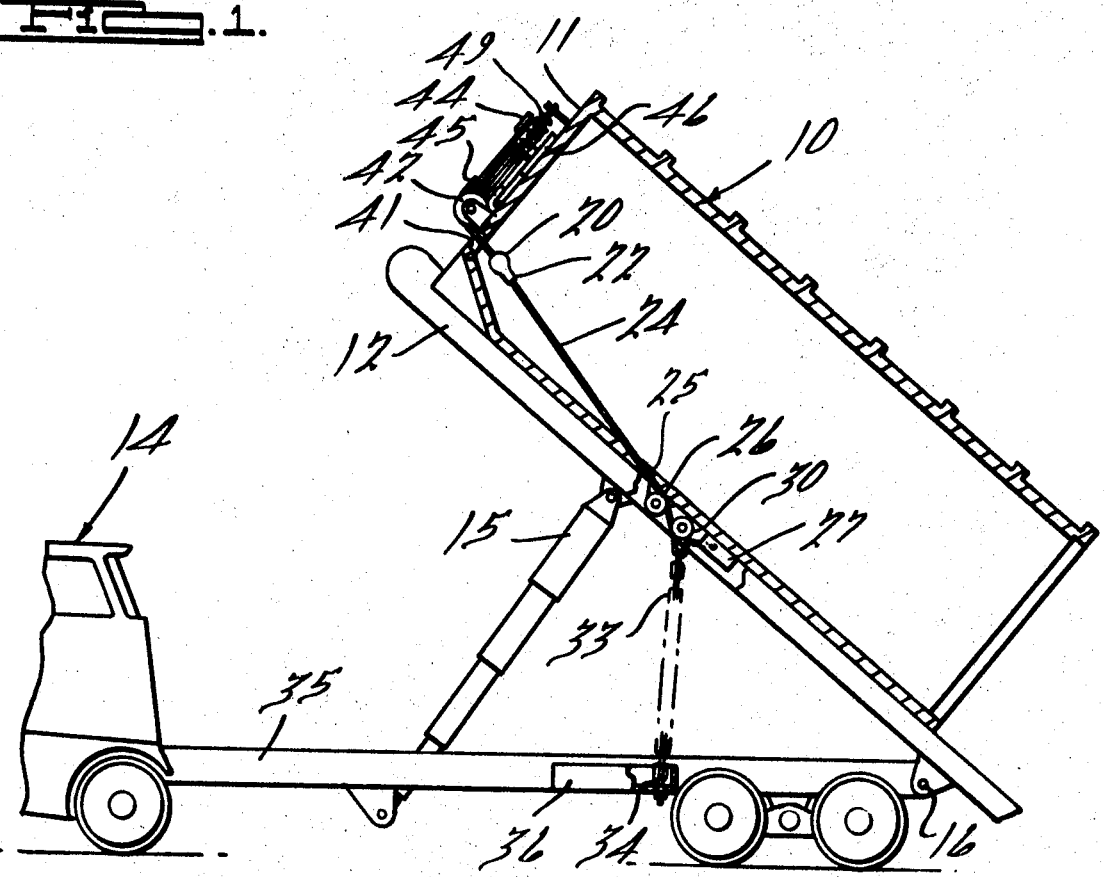
FIG. 2 is a similar view showing the body partly raised.

When the body is raised by the cylinders 15, the length of the chains 33 is sufficient to permit the pulleys and blocks 30-32 to move upwardly a desired distance without applying actuating tension to the cables 24 until the body reaches a predetermined angle, such for example as indicated in FIG. 2. After chains 33 have reached full extension, further lifting movement of the body causes the chains and pulleys 30 to pull the cables 24 outwardly as the body moves upwardly away from the now-restrained pulleys 30. At the same time, the rod 50, in moving away from truck frame 35, has permitted pulley 44 to move downwardly toward pulley 45, paying out the cable 40 to permit rearward movement of cables 24. Tube 20 is thereby moved toward the rear of the vehicle to loosen and assist in forcing the load from the open rear of the container.

In applying this invention to container bodies of the rolloff type which are designed to be moved off and onto the tilt bed, in order to leave the bodies at and remove them from the collection site, it is merely necessary to provide convenient means such as the hooks 37 for attaching and detaching the chains 33 with respect to the pulley blocks 32.

Figure 3:
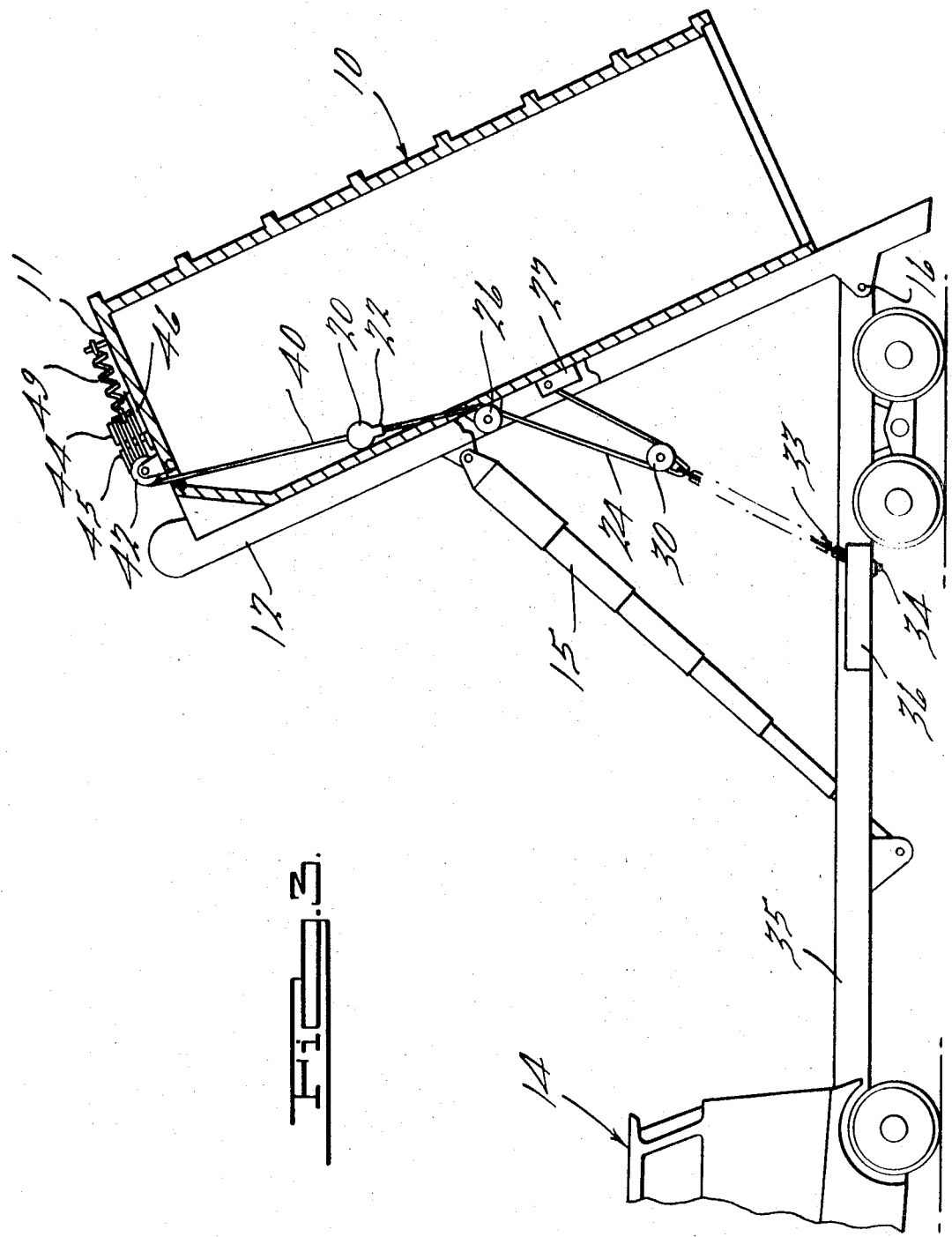
FIG. 3 is a similar view showing the body fully raised.
Figure 4:
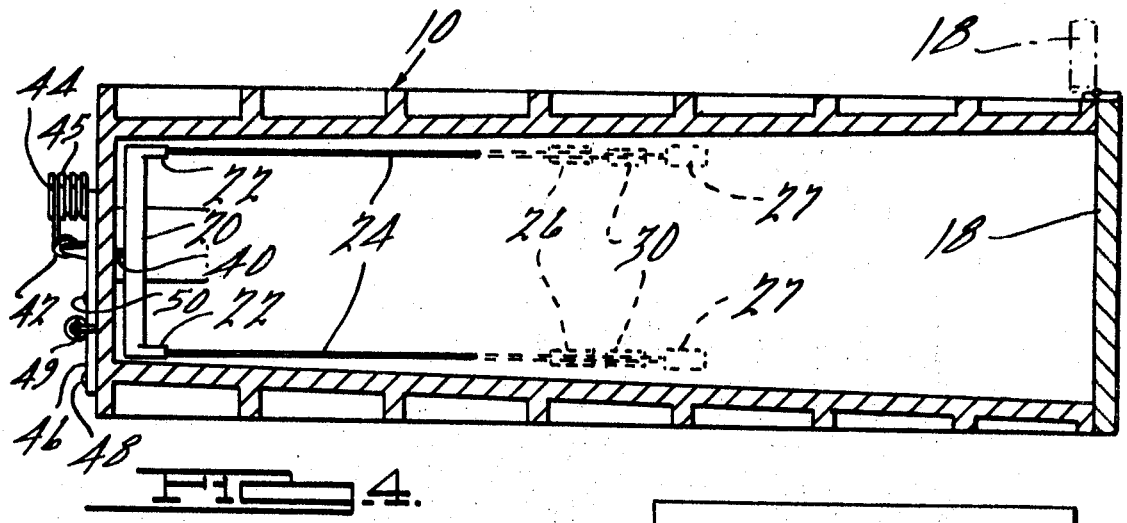
FIG. 4 is a plan view of the body.
Figure 5:
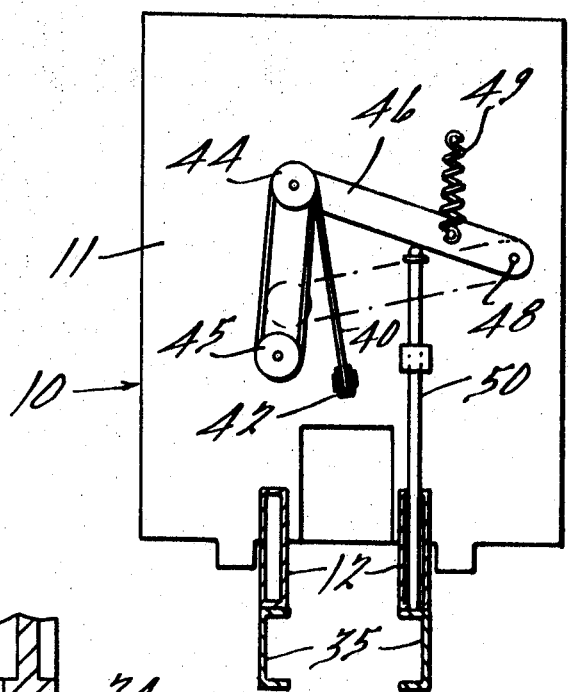
FIG. 5 is a front elevational view of the body.
Figure 6:
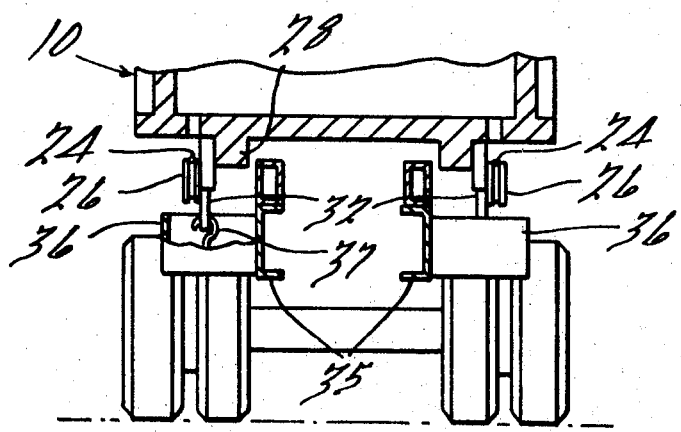
FIG. 6 is a cross section taken substantially on the line VI—VI of FIG. 1, and looking in the direction of the arrows.

Due to the lost motion provided by the slack incorporated in the chains 33, the container is raised to an angle such that gravity is also exerting substantial dislodging effort on the load by the time tube 20 commences to move rearwardly. Thus the cables 24 and other parts can be relatively light, as compared to the means required to operate a pushout panel in a horizontal path as taught in the aforementioned Bowles patent. Although in FIG. 2 the chains permit the container to rise about 40° before the slack is taken up, this can be varied, depending upon the nature of material being handled and the dimensions of the container. This adjustment is effected simply by hooking the chains at different lengths. It will also be appreciated that due to the load clearing effect of tube 20, it is not normally necessary to lift the container to the high angle shown in FIG. 3 (approximately 65°) in order to discharge the load.

This Detailed Description of Preferred Form of the Invention, and the accompanying drawings, have been furnished in compliance with the statutory requirement to set forth the best mode contemplated by the inventor of carrying out the invention. The prior portions consisting of the "Abstract of the Disclosure" and the "Background of the Inventopn" are furnished without prejudice in an effort to comply with administrative requirements of the Patent Office.

What is claimed is:

1. Means for ejecting a load from a rear end opening of a container body having an openable rear end when said body is on the tilt bed of a tilt bed vehicle including an ejection member movable longitudinally in the body; means including a flexible pull member connected to the ejection member inside the body and extending rearwardly within the body and thence outwardly and downwardly from the body; lost motion tension means connecting said pull member to a part of the vehicle independent of the tilt bed whereby the ejection member is pulled toward the rear when the tilt bed is raised.

2. In combination with means as defined in claim 1, means carried by the body for pulling the ejection member forwardly when the tension on said previously mentioned pull member is relaxed.

3. Means as defined in claim 2 wherein said means for pulling the ejection member forwardly includes resilient biasing means urging said ejection member forwardly in the opposite direction from that in which it is pulled by said first-mentioned pull member.

4. Means as defined in claim 1 wherein said ejection member compromises a crosspiece extending transversely within and substantially the full width of the body, a pair of said pull members being provided, one connected to each end of the crosspiece and extending rearwardly substantially parallel to each other and out of the body through an opening each pull member having a rear end anchored to the under portion of the body outside the same, said lost motion tension means including a pulley block on each pull member between the opening and the anchored end.

5. Means as defined in claim 1 wherein said ejection member comprises a crosspiece extending transversely within and substantially the full width of the body, a pair of said pull members being provided, one connected to each end of the crosspiece and extending rearwardly substantially parallel to each other, means carried by the body for pulling the ejection member forwardly when the tension on said previously mentioned pull member is relaxed comprising a cable secured to said crosspiece and extending forwardly therefrom and out of the body, and takeup means for said cable mounted on an outside forward portion of said body.

6. Means as defined in claim 5 wherein said takeup means includes a movable takeup member over which said cable is trained, means biasing the takeup member in a direction to pull the cable and crosspiece forwardly, and means responsive to lowering and raising the bed for locking and unlocking the takeup member.

7. Means as defined in claim 6 wherein the takeup member is a pulley bodily shiftable in the plate of its groove and over which the cable is looped.

* * * * *